United States Patent
Mori et al.

(10) Patent No.: US 12,137,182 B2
(45) Date of Patent: *Nov. 5, 2024

(54) COMMUNICATION EQUIPMENT, CONTROL METHOD, AND PROGRAM

(71) Applicant: KYOCERA Corporation, Kyoto (JP)

(72) Inventors: Daisuke Mori, Yokohama (JP); Taku Hayashi, Yokohama (JP); Kazuya Chitou, Tokyo (JP); Kazuo Onishi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 659 days.

This patent is subject to a terminal disclaimer.

(21) Appl. No.: 17/192,636

(22) Filed: Mar. 4, 2021

(65) Prior Publication Data
US 2021/0195014 A1 Jun. 24, 2021

Related U.S. Application Data

(63) Continuation of application No. PCT/JP2020/033007, filed on Sep. 1, 2020.

(30) Foreign Application Priority Data

Sep. 5, 2019 (JP) .................................. 2019-161881

(51) Int. Cl.
*H04M 1/72469* (2021.01)
*H04W 4/20* (2018.01)

(52) U.S. Cl.
CPC ......... *H04M 1/72469* (2021.01); *H04W 4/20* (2013.01)

(58) Field of Classification Search
None
See application file for complete search history.

(56) References Cited

U.S. PATENT DOCUMENTS 9,092,179 B2   7/2015   Uchikawa
9,949,197 B2   4/2018   Tsuda
(Continued)

FOREIGN PATENT DOCUMENTS

EP   3474603 A1 *   4/2019   ............ H04W 48/06
JP   2014-060685 A   4/2014
(Continued)

OTHER PUBLICATIONS

3GPP Technical Report "3GPP TR 23.734 V16.2.0: Study on Enhancement of 5G System (5GS) for Vertical and Local Area Network (LAN) Services (Release 16)" Jun. 2019, pp. 1-117.
(Continued)

*Primary Examiner* — Jinsong Hu
*Assistant Examiner* — Alexander J Yi
(74) *Attorney, Agent, or Firm* — Studebaker & Brackett PC

(57) ABSTRACT

A communication equipment including a communication interface corresponding a cellular communication and a display, executes processing of acquiring network related information via the communication interface from a detected cellular communication network detected by the communication interface between a public cellular communication network and a local cellular communication network, processing of specifying, based on the network related information, a provided service type which is a type of service provided by the detected cellular communication network to the communication equipment, and processing of causing the specified provided service type to be displayed on the display.

14 Claims, 16 Drawing Sheets

(56) References Cited

U.S. PATENT DOCUMENTS

| | | | |
|---|---|---|---|
| 10,779,231 B2 | 9/2020 | Chen | |
| 2019/0174322 A1* | 6/2019 | Deviprasad | ......... H04L 41/0853 |
| 2020/0169921 A1* | 5/2020 | Zhu | ......................... H04W 8/02 |
| 2020/0236516 A1 | 7/2020 | Kato et al. | |

FOREIGN PATENT DOCUMENTS

| | | | | |
|---|---|---|---|---|
| JP | 2014-179739 A | 9/2014 | | |
| JP | 2016-140081 A | 8/2016 | | |
| JP | 2018-117382 A | 7/2018 | | |
| JP | 2019-062319 A | 4/2019 | | |
| WO | WO-0221778 A1 * | 3/2002 | ......... H04L 41/0695 |
| WO | 2017/143047 A1 | 8/2017 | | |
| WO | 2018/090172 A1 | 5/2018 | | |
| WO | 2019/024604 A1 | 2/2019 | | |

OTHER PUBLICATIONS

3GPP Technical Specification; "3GPP TS 23.501 V15.5.0, System Architecture for the 5G System, Stage 2, (Release 15)", Mar. 2019, pp. 1-240.

\* cited by examiner

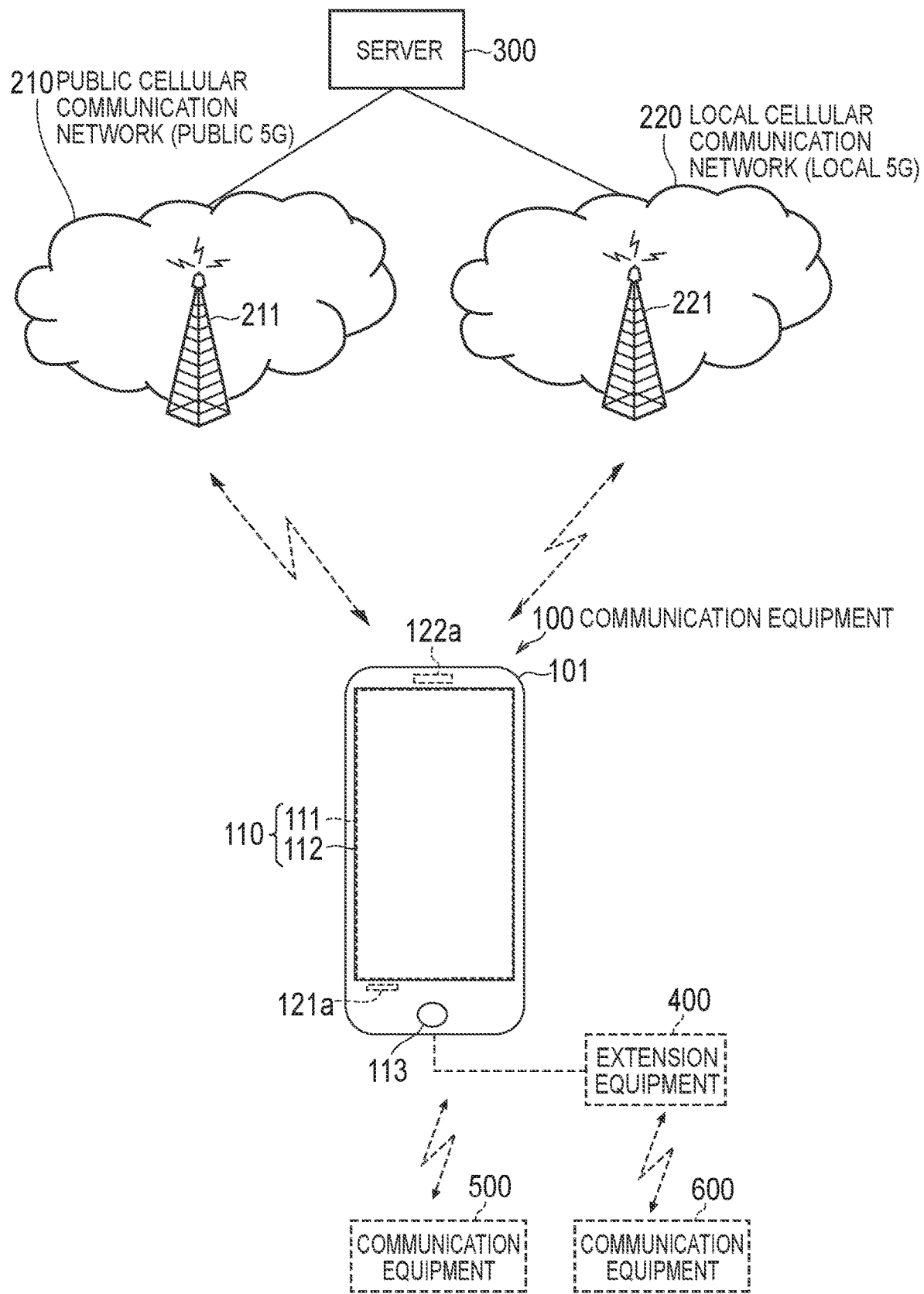

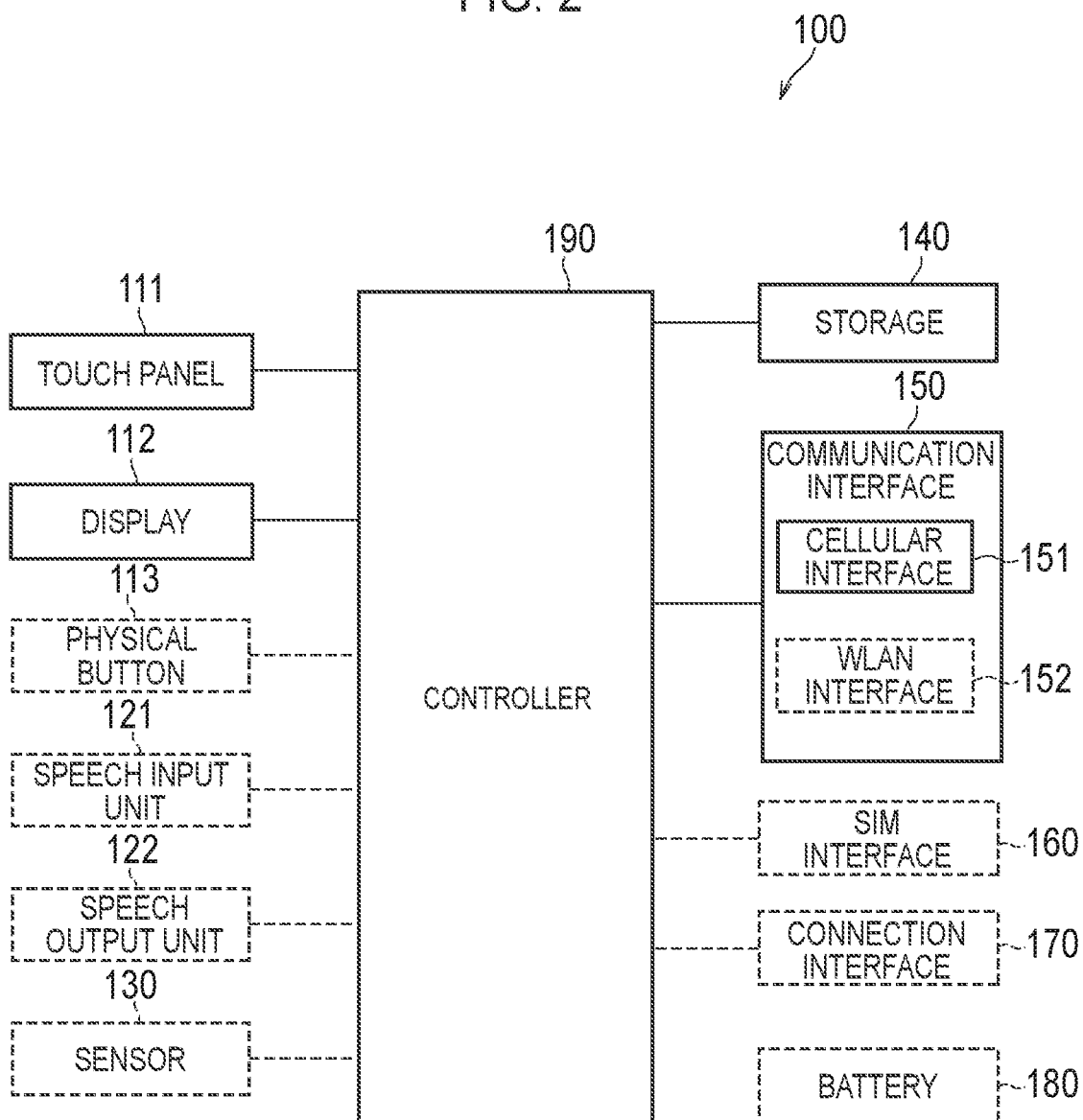

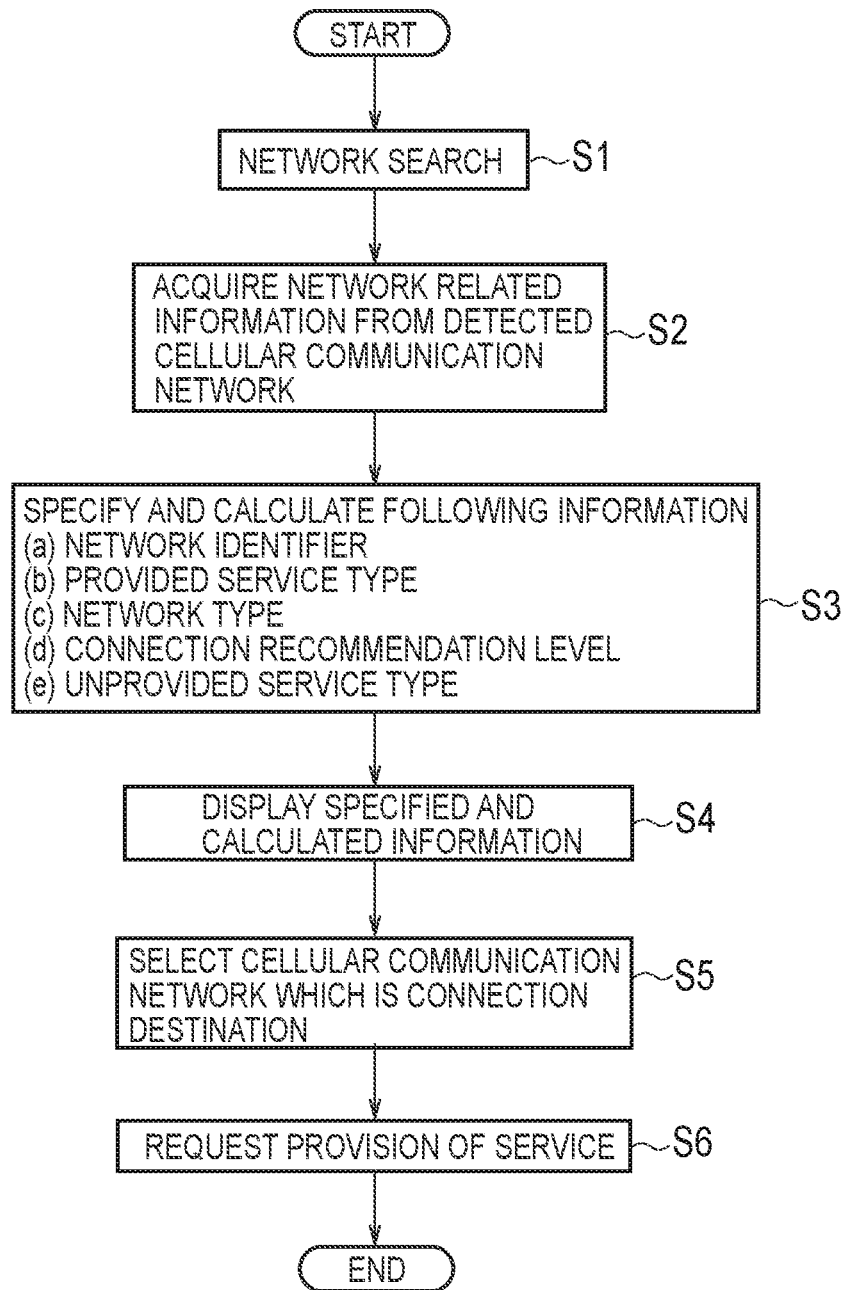

FIG. 4

| No | SERVICE TYPE | IMPLEMENTATION METHOD |
|---|---|---|
| No.1 | DATA COMMUNICATION (INTERNET COMMUNICATION) | DETERMINE BASED ON WHETHER COMMUNICATION IS POSSIBLE WITH SPECIFIC DEVICE OR SERVER OR WHETHER GIVEN NUMBER OF UL/DL PACKETS ARE RECEIVED/TRANSMITTED PER UNIT TIME |
| No.2 | SPEECH COMMUNICATION | DETERMINE BASED ON WHETHER COMMUNICATION IS POSSIBLE WITH SIP SERVER OR STATE OF LINE (CS) |
| No.3 | LOW POWER CONSUMPTION FUNCTION | lowPowerConsumption |
| No.4 | TEMPERATURE ABNORMALITY PREVENTION FUNCTION | overheatingAssistance |
| No.5 | HIGH SPEED, HIGH CAPACITY (eMBB) | S-NSSAI(SLICE/SERVICE TYPE(SST) - STANDARDIZED SST: eMBB(1) |
| No.6 | HIGH RELIABILITY, LOW LATENCY (URLLC) | S-NSSAI(SLICE/SERVICE TYPE(SST) - STANDARDIZED SST: URLLC(2) |
| No.7 | MULTIPLE CONNECTION (mIoT) | S-NSSAI(SLICE/SERVICE TYPE(SST) - STANDARDIZED SST: MIOT(3) |
| No.8 | OTHER SERVICE: BUSINESS, FACTORY, TRANSPORT, AIRPORT, DRONE, TRAIN | S-NSSAI(SLICE/SERVICE TYPE(SST) - NON-STANDARDIZED SST: BUSINESS(x),FACTORY(y),TRANSPORT(z), AIRPORT(xx), DRONE(yy), TRAIN(zz) |

FIG. 5

| SERVICE TYPE | IMPLEMENTATION METHOD |
|---|---|
| DATA COMMUNICATION (INTERNET COMMUNICATION) | DETECT CONNECTION STATUS OF INTERNET AND CALCULATE SCORE |
| SPEECH COMMUNICATION | DETECT SUPPORT STATUS OF SPEECH COMMUNICATION AND CALCULATE SCORE |
| LOW POWER CONSUMPTION FUNCTION | DETECT STATUS OF LOW POWER CONSUMPTION MODE AND CALCULATE SCORE |
| TEMPERATURE ABNORMALITY PREVENTION FUNCTION | DETECT TEMPERATURE ABNORMALITY AND CALCULATE SCORE |
| HIGH SPEED, HIGH CAPACITY (eMBB) | DETECT STATUS OF S-NSSAI AND CALCULATE SCORE |
| HIGH RELIABILITY, LOW LATENCY (URLLC) | DETECT STATUS OF S-NSSAI AND CALCULATE SCORE |
| MULTIPLE CONNECTION (mIoT) | DETECT STATUS OF S-NSSAI AND CALCULATE SCORE |
| OTHER SERVICE: BUSINESS, FACTORY, TRANSPORT, AIRPORT, DRONE, TRAIN | DETECT STATUS OF S-NSSAI AND CALCULATE SCORE |

FIG. 8A
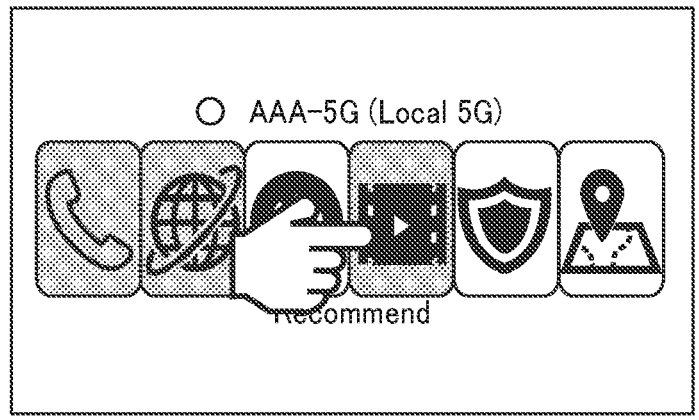
FIG. 8B
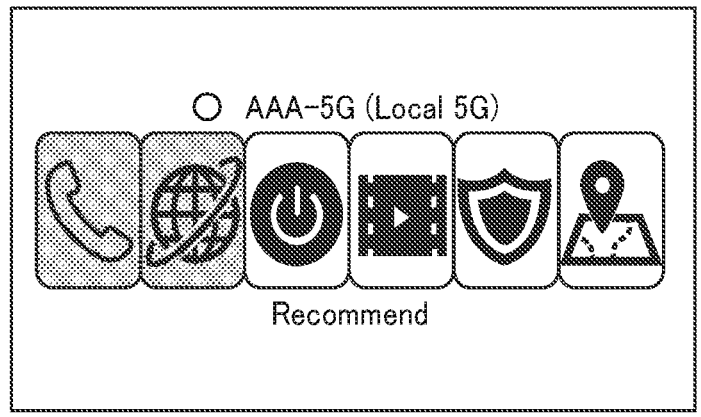

FIG. 16
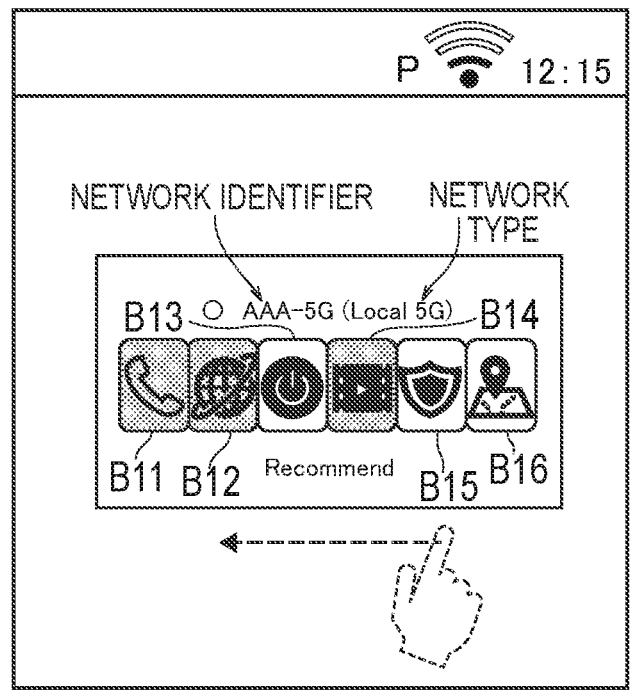
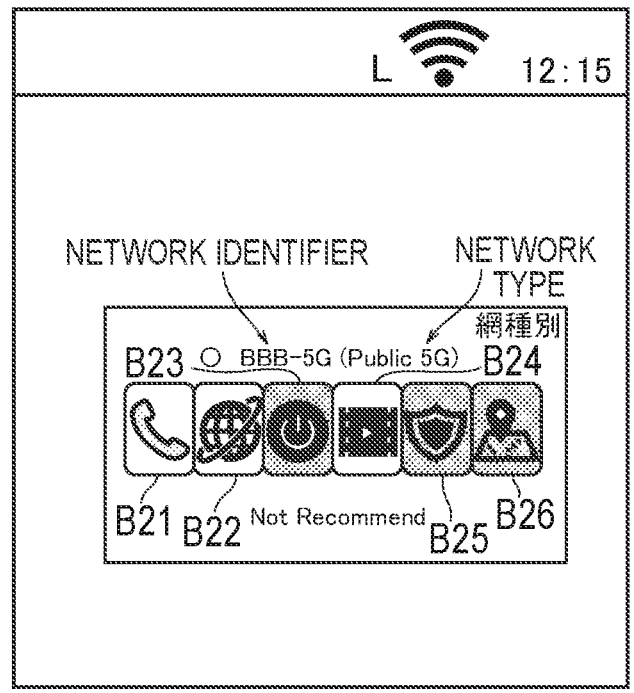

COMMUNICATION EQUIPMENT, CONTROL METHOD, AND PROGRAM

RELATED APPLICATIONS

The present application is a continuation based on PCT Application No. PCT/JP2020/033007, filed on Sep. 1, 2020, which claims the benefit of Japanese Patent Application No. 2019-161881 filed on Sep. 5, 2019. The content of which is incorporated by reference herein in their entirety.

TECHNICAL FIELD

The present disclosure relates to communication equipment, a control method, and a program.

BACKGROUND ART

In recent years, cellular communication systems which comply with the 5th generation (5G) cellular communication standards have attracted attention. Such cellular communication systems assume establishment of local cellular communication networks which are operated by general corporations, organizations or individuals as well as public cellular communication networks operated by telecommunication carriers. Note that the local cellular communication network is sometimes referred to as a private cellular communication network or a non-public cellular communication network.

The local cellular communication network can be flexibly established and utilized by various subjects in accordance with regional needs and individual needs of industrial fields. Further, the local cellular communication network is less congested than the public cellular communication network and provides a favorable propagation environment, so that the local cellular communication network is considered to be able to provide favorable service to communication equipment.

Under the mixed environment of the public cellular communication network and the local cellular communication network, communication equipment has an option to select a connection destination from these two types of cellular communication networks. The communication equipment typically preferentially selects a home network which is a cellular communication network subscribed by the own equipment or selects a cellular communication network which makes received power the highest at the own equipment.

CITATION LIST

Non-Patent Document

Non-Patent Document 1: 3GPP Technical Report "3GPP TR 23.734 V16.2.0: Study on enhancement of 5G System (5GS) for vertical and Local Area Network (LAN) services (Release 16)", June, 2019

SUMMARY

A communication equipment according to a first embodiment includes a communication interface, and a controller configured to acquire network related information via the communication interface from a detected cellular communication network which is detected by the communication interface between a public cellular communication network and a local cellular communication network. The controller is configured to specify, based on the network related information, a provided service type which is a type of service provided by the detected cellular communication network to the communication equipment, and cause the specified provided service type to be displayed on a display.

A communication equipment according to a second embodiment includes a communication interface, and a controller configured to cause at least one of a first object corresponding to a connection recommendation level of a public cellular communication network and a second object corresponding to a connection recommendation level of a local cellular communication network to be displayed on at least part of a display based on a detected cellular communication network detected by the communication interface between the public cellular communication network and the local cellular communication network.

A control method according to a third embodiment is a method for controlling communication equipment including a display and a communication interface which corresponds cellular communication. The control method includes acquiring network related information via the communication interface from a detected cellular communication network detected by the communication interface between a public cellular communication network and a local cellular communication network, specifying, based on the network related information, a provided service type which is a type of service provided by the detected cellular communication network to the communication equipment, and causing the specified provided service type to be displayed on the display.

BRIEF DESCRIPTION OF DRAWINGS

FIG. 1 is a diagram illustrating a configuration of a communication system according to an embodiment.

FIG. 2 is a diagram illustrating a configuration of communication equipment according to an embodiment.

FIG. 3 is a diagram illustrating operation of the communication equipment according to an embodiment.

FIG. 4 is a diagram illustrating operation of specifying a provided service type according to an embodiment.

FIG. 5 is a diagram illustrating operation of calculating a connection recommendation level according to an embodiment.

FIGS. 8A and 8B are diagrams illustrating a screen display example according to an embodiment.

FIG. 16 is a diagram illustrating a screen display example according to an embodiment.

DESCRIPTION OF EMBODIMENT

Figure 6:
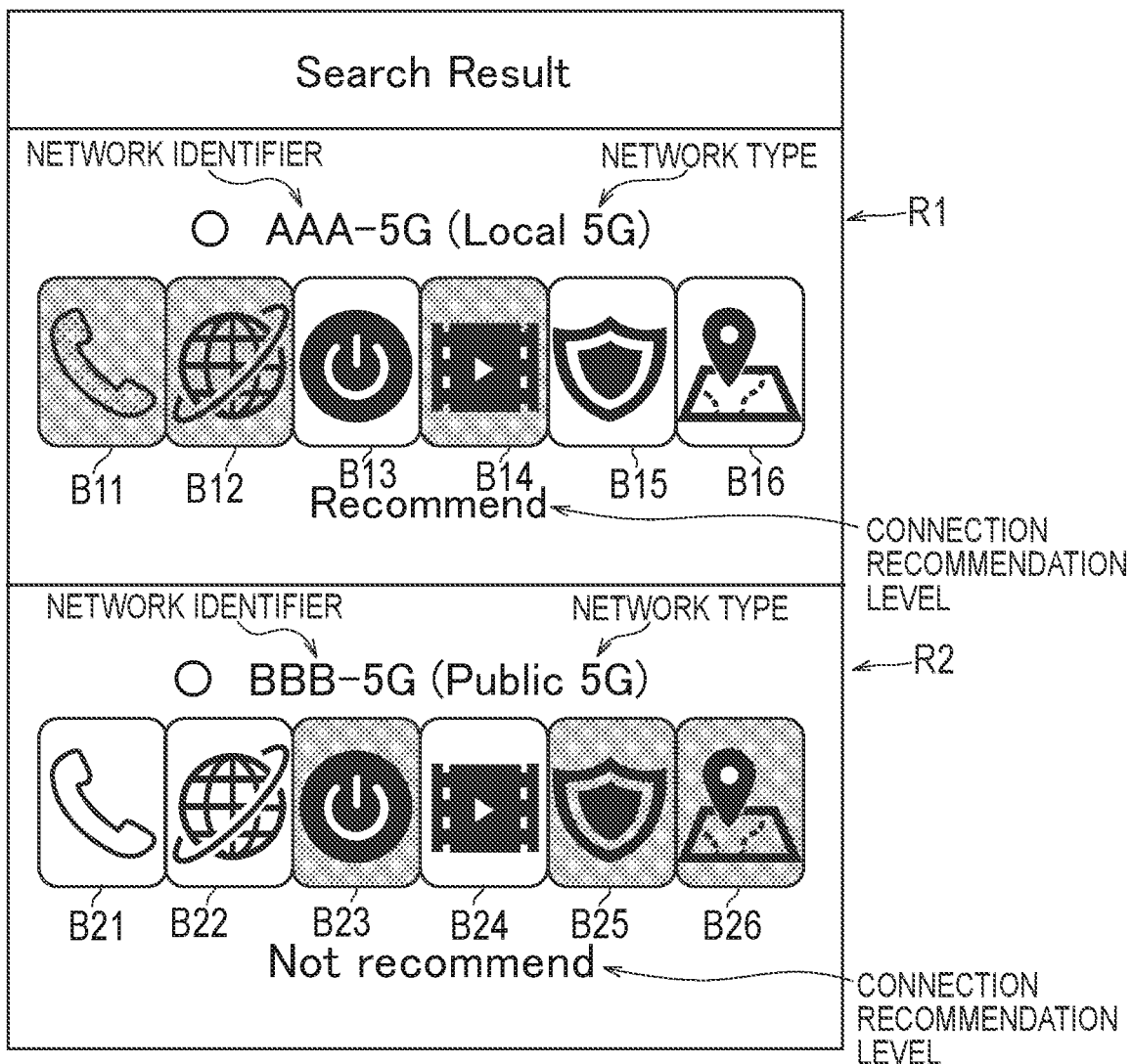
FIG. 6 is a diagram illustrating a screen display example according to an embodiment.

In a case where a local cellular communication network is established with an aim to provide specific service, a type of service provided by the local cellular communication network can be sometimes limited. Meanwhile, a public cellular communication network, which provides versatile service, sometimes does not provide particular service which meets regional needs and individual needs of industrial fields.

Thus, under the mixed environment of the public cellular communication network and the local cellular communication network, application of a typical connection destination selection method as described above can invite a situation in which service which is desired to be utilized by a user of the communication equipment is not provided in a cellular communication network which is a connection destination.

The present disclosure is therefore directed to making it easier to appropriately select a cellular communication network which is a connection destination under the mixed environment of a public cellular communication network and a local cellular communication network.

Embodiments will be described with reference to the drawings. In description of the drawings, the same or similar reference numerals are assigned to the same or similar portions.

Configuration of Communication System

A configuration of a communication system according to an embodiment will be described first. FIG. 1 is a diagram illustrating a configuration of the communication system according to an embodiment. The communication system according to an embodiment is a cellular communication system which complies with the 5th generation (5G) 3GPP standards.

As illustrated in FIG. 1, the communication system according to an embodiment includes communication equipment 100, a public cellular communication network 210, a local cellular communication network 220, and a server 300.

The communication equipment 100 is equipment having a function of performing cellular communication with a cellular communication network. The communication equipment 100 only requires to be equipment which has a function of performing cellular communication and which has a user interface (UI). For example, the communication equipment 100 is a smartphone, a table terminal, a notebook PC, or a mobile router. Note that in the 3GPP standards, the communication equipment 100 is referred to as user equipment (UE).

The public cellular communication network 210 is a cellular communication network operated by a communication carrier. The public cellular communication network 210 is sometimes referred to as public 5G. The communication carrier which operates the public cellular communication network 210 receives issuance of a nationwide license.

The local cellular communication network 220 is a cellular communication network which can be flexibly established and utilized by various subjects in accordance with regional needs and individual needs of industrial fields. The local cellular communication network 220 is sometimes referred to as local 5G. For example, a general corporation, an organization or an individual can operate the local cellular communication network 220 by receiving allocation of frequencies. A license limited to a local area such as inside of a facility of a general corporation is issued for the local cellular communication network 220.

The public cellular communication network 210 and the local cellular communication network 220 comply with the 5G 3GPP standards. The public cellular communication network 210 includes a base station 211, and the public cellular communication network 210 includes a base station 221. While in FIG. 1, each cellular communication network includes only one base station, actually, each cellular communication network may include a plurality of base stations. Note that in the 5G 3GPP standards, the base station is referred to as gNB. The base station establishes a next generation radio access network (NG-RAN) which is a 5G radio access network.

Each of the public cellular communication network 210 and the local cellular communication network 220 further includes a 5G core network (5GC) which is a 5G core network. The 5G assumes connection of various kinds of communication equipment to the cellular communication network, and thus, requires to support various kinds of service having different requirements such as high speed, high capacity, high reliability and low latency. Thus, the 5GC is theoretically divided into a plurality of slices in accordance with different kinds of service (service requirements).

Here, an identifier called single-network slice selection assistance information (S-NSSAI) is allocated to each slice. Each slice is associated with one service type (SST). While eMBB (high speed, high capacity), mIoT (multiple connection, power saving, low cost), URLLC (low latency, high reliability) are defined in the standards as the service types, service types which are not defined in the standards can be also used.

In a case where the local cellular communication network 220 is established with an aim to provide specific service, a type of service (SST) to be provided by the local cellular communication network 220 can be sometimes limited. Meanwhile, the public cellular communication network 210, which provides versatile service, sometimes does not provide particular service which meets regional needs and individual needs of industrial fields. Note that "service to be provided by the cellular communication network" can be regarded as a "function supported by the cellular communication network".

The server 300 performs communication with the communication equipment 100 via the public cellular communication network 210 or the local cellular communication network 220. The server 300 may be a server for managing the local cellular communication network 220.

Note that at least one piece of communication equipment 500 may be connected to the communication equipment 100 in a wired or wireless manner. The communication equipment 500, for example, establishes a wireless local area network (WLAN) connection with the communication equipment 100 and performs communication with a cellular communication network which is a connection destination of the communication equipment 100 via the communication equipment 100. This enables the communication equipment 500 to perform communication with a cellular communication network via the communication equipment 100 even in a case where the communication equipment 500 does not have a cellular communication function.

Extension equipment 400 may be connected to the communication equipment 100 in a wired or wireless manner. The extension equipment 400, for example, establishes a universal serial bus (USB) connection with the communication equipment 100. The extension equipment 400 may have a function of feeding power to the communication equipment 100. The extension equipment 400 may be a cradle.

At least one piece of communication equipment 600 may be connected to the extension equipment 400 in a wired or wireless manner. The communication equipment 600, for example, establishes a WLAN connection with the extension equipment 400 and performs communication with a cellular communication network which is a connection destination of the communication equipment 100 via the extension equipment 400 and the communication equipment 100. This enables the communication equipment 600 to perform communication with a cellular communication network via the extension equipment 400 and the communication equipment 100 even in a case where the communication equipment 600 does not have a cellular communication function.

Configuration of Communication Equipment

A configuration of the communication equipment 100 according to an embodiment will be described next. As illustrated in FIG. 1, the communication equipment 100 includes a touch panel display 110, at least one physical button 113, a microphone 121a, and a speaker 122a. However, components indicated with dashed lines in FIG. 1 and FIG. 2 are not essential.

The touch panel display 110 is provided so that a display surface is exposed from a chassis 101 of the communication equipment 100. The touch panel display 110 includes a touch panel 111 and a display 112.

The touch panel 111 accepts operation input (touch input) to the communication equipment 100. While touch may be detected using, for example, a resistive film scheme or a capacitance scheme, an arbitrary scheme may be used as a method for detecting touch. The display 112 outputs an image.

The display 112 displays an object such as characters (including a symbol), an image and a graphic on a screen. The display 112 is, for example, a liquid crystal display or an organic electro luminescence (EL) display. At the touch panel display 110, the display 112 is provided so as to overlap with the touch panel 111, and a display region of the display 112 overlaps with the touch panel 111.

The physical button 113 accepts operation input (depression) to the communication equipment 100. The physical button 113 is, for example, a home button, a power button, an audio regulation button, or the like.

The microphone 121a accepts speech input to the communication equipment 100. Further, the microphone 121a collects ambient sound.

The speaker 122a outputs audio. Further, the speaker 122a outputs speech on a telephone, information of various kinds of programs, or the like, as speech.

FIG. 2 is a diagram illustrating a configuration of the communication equipment 100 according to an embodiment.

As illustrated in FIG. 2, the communication equipment 100 includes the touch panel 111, the display 112, the physical button 113, a speech input unit 121, a speech output unit 122, a sensor 130, a storage 140, a communication interface 150, a subscriber identity module (SIM) interface 160, a connection interface 170, a battery 180, and a controller 190.

The touch panel 111 inputs a signal corresponding to touch operation to the controller 190. The display 112 displays an object such as characters, an image and a graphic on a screen based on a signal input from the controller 190.

The speech input unit 121 inputs a signal corresponding to input speech to the controller 190. The speech input unit 121 may be the microphone 121a illustrated in FIG. 1 or may be an input interface to which an external microphone can be connected. The external microphone may be provided at the extension equipment 400.

The speech output unit 122 outputs speech based on the signal input from the controller 190. The speech output unit 122 may be the speaker 122a illustrated in FIG. 1 or may be an output interface to which an external speaker can be connected. The external speaker may be provided at the extension equipment 400.

The sensor 130 detects various kinds of physical quantity and data and outputs the detection result to the controller 190. For example, the sensor 130 includes a position sensor, an acceleration sensor, and a temperature sensor. The position sensor detects a position of the own equipment and outputs position data to the controller 190. The position sensor may include a global navigation satellite system (GNSS) receiver. The GNSS receiver measures a position based on a GNSS satellite signal and outputs GNSS position data indicating a geographical position (latitude, longitude) of the own equipment to the controller 190. The acceleration sensor detects acceleration applied to the own equipment and outputs acceleration data to the controller 190. The acceleration sensor may be a multi-axis acceleration sensor including a plurality of acceleration sensors. The temperature sensor detects a temperature and outputs temperature data to the controller 190. At least one of these sensors may be provided at external equipment (for example, the extension equipment 400).

The storage 140 includes at least one memory which stores programs and data. The storage 140 is also utilized as a work area in which a processing result of the controller 190 is temporarily stored. The storage 140 may include a semiconductor storage medium and an arbitrary non-transitory storage medium such as a magnetic storage medium. The storage 140 may include a plurality of types of storage media. The storage 140 may include combination of a portable storage medium such as a memory card, an optical disk and a magnetooptic disk, and a reading device of the storage medium. The storage 140 may include a storage device which is to be utilized as a temporal memory area such as a random access memory (RAM).

The communication interface 150 performs communication in a wireless manner. The communication interface 150 includes a cellular interface 151 and a WLAN interface 152. The cellular interface 151 complies with, for example, the 5G cellular communication standards. The WLAN interface 152 complies with, for example, IEEE 802.11 standards.

A SIM (or a user identity module (UIM)) is attached to the SIM interface 160. The SIM may be attachable to/detachable from the SIM interface 160. When instructed by the controller 190 to read or write information, the SIM interface 160 reads information recorded in the SIM or writes information in the SIM. The SIM may be an embedded SIM (eSIM). The SIM may be supplied from a communication carrier or may be acquired using other means.

In an embodiment, a SIM for the public cellular communication network 210 and a SIM for the local cellular communication network 220 may be individually prepared. In a case where the SIM for the public cellular communication network 210 is used, the controller 190 uses the public cellular communication network 210 as a home network and uses the local cellular communication network 220 as a roaming network. Meanwhile, in a case where the SIM for the local cellular communication network 220 is used, the controller 190 uses the local cellular communication network 220 as the home network and uses the public cellular communication network 210 as a roaming network. Alternatively, both the SIM for the public cellular communication network 210 and the SIM for the local cellular communication network 220 may be attachable to the SIM interface 160.

The connection interface 170 is an interface which is electrically connected to the extension equipment 400. The connection interface 170 may be any interface which is electrically connected to the extension equipment 400, and is, for example, a USB interface.

The battery 180 stores electrical power for driving the own equipment. The battery 180 may be any type of secondary cells, and is, for example, a lithium ion battery.

The controller 190 is an arithmetic processing unit. The arithmetic processing unit includes, but not limited to, for example, a central processing unit (CPU), a system-on-chip (SoC), a micro control unit (MCU), a field-programmable gate array (FPGA), and a coprocessor. Further, the controller 190 includes a graphics processing unit (GPU), a video RAM (VRAM), or the like, and draws various kinds of images on the display 112. The controller 190 may include a plurality of arithmetic processing units and may execute various kinds of control through cooperation of the plurality of arithmetic processing units.

The controller 190 has control over operation of the communication equipment 100 to implement various kinds of functions. The controller 190 executes various kinds of control based on operation input detected by the touch panel 111 and/or the physical button 113. The controller 190 may perform output in accordance with the input operation signal from the speech output unit 122, the display 112, or the like.

Operation of Communication Equipment

Operation of the communication equipment 100 according to an embodiment will be described next. FIG. 3 is a diagram illustrating the operation of the communication equipment 100 according to an embodiment.

As illustrated in FIG. 3, the controller 190 controls the cellular interface 151 to perform network search in step S1. The network search refers to operation of detecting a connectable cellular communication network. For example, the cellular interface 151 tries reception of a radio signal (for example, a synchronization signal or a reference signal) transmitted by a base station of each cellular communication network (that is, the public cellular communication network 210, the local cellular communication network 220). The controller 190 measures received power of the radio signal and, in a case where the received power exceeds a threshold, determines that the cellular communication network corresponding to this received power is connectable. In the following description, a cellular communication network detected through network search will be referred to as a "detected cellular communication network".

The detected cellular communication network includes three patterns of (1) only the public cellular communication network 210, (2) only the local cellular communication network 220 and (3) both the public cellular communication network 210 and the local cellular communication network 220. While a case will be mainly described below where the pattern of the detected cellular communication network is both the public cellular communication network 210 and the local cellular communication network 220, the detected cellular communication network may be only the public cellular communication network 210 or only the local cellular communication network 220.

The controller 190 acquires network related information from each detected cellular communication network via the cellular interface 151 in step S2. The network related information includes, for example, the following information (a) to (c).

(a) Network Identifier:

A network identifier is an identifier for identifying the detected cellular communication network.

(b) Information Indicating a Provided Service Type:

The provided service type is a type of service to be provided by the detected cellular communication network to the communication equipment 100. As described above, each of the public cellular communication network 210 and the local cellular communication network 220 is theoretically divided into a plurality of slices in accordance with different service types. An identifier referred to as S-NSSAI is allocated to each slice. The controller 190 acquires S-NSSAI of each slice of the detected cellular communication network as information indicating the provided service type of this detected cellular communication network. The controller 190 may acquire information other than the S-NSSAI as the information indicating the provided service type.

(c) Information Indicating a Network Type:

The network type is a type indicating whether the detected cellular communication network is the public cellular communication network 210 or the local cellular communication network 220.

Further, the controller 190 may acquire the received power measured upon network search in step S1 as the network related information.

In step S3, the controller 190 specifies and calculates the following information (a) to (e) to be displayed on the display 112 based on the network related information acquired in step S2.

(a) Network Identifier (for Display):

The controller 190 specifies the network identifier of the detected cellular communication network. The controller 190 may specify the network identifier acquired in step S2 as is as the network identifier of the detected cellular communication network or may convert a form of the network identifier acquired in step S2 into a form having high readability.

(b) Provided Service Type:

As illustrated in FIG. 4, the controller 190 specifies the provided service type from the following candidates No. 1 to No. 8 for the service type based on the information indicating the provided service type acquired in step S2. In a case where there is a plurality of detected cellular communication networks, the controller 190 specifies the provided service type for each of the detected cellular communication networks.

No. 1: Data Communication (Internet Communication)

The controller 190 determines whether communication is possible with a specific device or a server via the detected cellular communication network or whether a given number of UL/DL packets are transmitted/received via the detected cellular communication network per unit time. In a case where the controller 190 determines that communication is possible with a specific device or a server via the detected cellular communication network, the controller 190 specifies data communication as one of the provided service types of the detected cellular communication network. Alternatively, in a case where the controller 190 determines that a given number of uplink/downlink packets are transmitted/received via the detected cellular communication network per unit time, the controller 190 specifies data communication as one of the provided service types of the detected cellular communication network.

No. 2: Speech Communication

The controller 190 determines whether communication is possible with a SIP server via the detected cellular communication network or a state of a line (CS) of the detected cellular communication network. In a case where the controller 190 determines that communication is possible with a SIP server via the detected cellular communication network, the controller 190 specifies speech communication as one of the provided service types of the detected cellular communication network. Alternatively, in a case where the controller 190 determines that the line (CS) of the detected cellular communication network is available, the controller 190 specifies speech communication as one of the provided service types of the detected cellular communication network.

No. 3: Low Power Consumption Function (LowPowerConsumption)

The controller 190 determines whether or not a low power consumption function is configured for the communication equipment 100 from the detected cellular communication network. The low power consumption function is configured for the communication equipment 100, for example, using an RRC Reconfiguration message which is one type of an RRC message. In a case where the controller 190 determines that the low power consumption function is configured for the communication equipment 100 from the detected cellular communication network, the controller 190 specifies the low power consumption function as one of the provided service types of the detected cellular communication network.

No. 4: Temperature Abnormality Prevention Function (OverheatingAssistance)

The controller 190 determines whether or not a temperature abnormality prevention function is configured for the communication equipment 100 from the detected cellular communication network. The temperature abnormality prevention function is configured at for the communication equipment 100, for example, using an RRC Reconfiguration message which is one type of an RRC message. In a case where the controller 190 determines that the temperature abnormality prevention function is configured for the communication equipment 100 from the detected cellular communication network, the controller 190 specifies the temperature abnormality prevention function as one of the provided service types of the detected cellular communication network.

No. 5: High Speed, High Capacity (eMBB)

The controller 190 determines whether or not a slice/service type (SST) of the S-NSSAI acquired from the detected cellular communication network includes a value "1" allocated to eMBB in the standards. The communication equipment 100 is notified of the S-NSSAI using, for example, a Registration Accept message which is one type of a non-access stratum (NAS) message. In a case where the SST of the S-NSSAI acquired from the detected cellular communication network includes a value "1" allocated to the eMBB in the standards, the controller 190 specifies the eMBB as one of the provided service types of the detected cellular communication network.

No. 6: High Reliability, Low Latency (URLLC)

The controller 190 determines whether or not the SST of the S-NSSAI acquired from the detected cellular communication network includes a value "2" allocated to URLLC in the standards. In a case where the SST of the S-NSSAI acquired from the detected cellular communication network includes a value "2" allocated to the URLLC in the standards, the controller 190 specifies the URLLC as one of the provided service types of the detected cellular communication network.

No. 7: Multiple Connection (mIoT)

The controller 190 determines whether or not the SST of the S-NSSAI acquired from the detected cellular communication network includes a value "2" allocated to mIoT in the standards. In a case where the SST of the S-NSSAI acquired from the detected cellular communication network includes a value "2" allocated to the mIoT in the standards, the controller 190 specifies the mIoT as one of the provided service types of the detected cellular communication network.

No. 8: Other Service

The controller 190 determines whether or not the SST of the S-NSSAI acquired from the detected cellular communication network includes a value allocated to each type of service in individual specifications. For example, an SST "x" is allocated to Business, an SST "y" is allocated to Factory, an SST "z" is allocated to Transport, an SST "xx" is allocated to Airport, an SST "yy" is allocated to Drone, and an SST "zz" is allocated to Train. In a case where the SST of the S-NSSAI acquired from the detected cellular communication network includes a value allocated in the individual specifications, the controller 190 specifies the service type corresponding to this value as the provided service type of the detected cellular communication network.

(d) Connection Recommendation Level:

The controller 190 calculates a connection recommendation level indicating a level of recommendation of connection to the detected cellular communication network based on the provided service type specified as described above as illustrated in FIG. 5. Specifically, the controller 190 calculates a score for each provided service type and calculates the connection recommendation level from a sum of the scores for the detected cellular communication network. The connection recommendation level may be a sum of the scores or may indicate whether or not the sum of the scores is equal to or greater than a threshold. Alternatively, the connection recommendation level may indicate ranking of a plurality of detected cellular communication networks arranged in descending order of the sum of the scores.

In calculation of such a connection recommendation level, the controller 190 may calculate the connection recommendation level in view of past records of use of the service by the communication equipment 100. For example, the controller 190 manages records of use of the service in which the types of service used by the communication equipment 100 in the past are associated with the number of times the service is used (or a utilization period of the service). The controller 190 adjusts a score of the corresponding provided service type to be higher as the service has more records of use. As a specific example, in a case where the detected cellular communication network provides high speed, high capacity (eMBB) service, and the communication equipment 100 frequently utilizes the high speed, high capacity (eMBB) service, a score corresponding to the high speed, high capacity (eMBB) service becomes higher, which results in making a connection recommendation level corresponding to this detected cellular communication network higher.

Further, the controller 190 may calculate the connection recommendation level in view of information regarding other pieces of communication equipment (the communication equipment 500, the communication equipment 600 illustrated in FIG. 1) directly or indirectly connected to the communication equipment 100. For example, the controller 190 adjusts a score of the multiple connection (mIoT) service to be higher based on the number of other pieces of communication equipment directly or indirectly connected to the communication equipment 100. As a specific example, in a case where the detected cellular communication network provides the multiple connection (mIoT) service, and the number of other pieces of communication equipment directly or indirectly connected to the communication equipment 100 exceeds a threshold, a score corresponding to the multiple connection (mIoT) service becomes higher, which results in making a connection recommendation level corresponding to this detected cellular communication network higher. Alternatively, the controller 190 may acquire types of service which is desired to be provided respectively from other pieces of communication equipment which are directly or indirectly connected to the communication equipment 100 and may calculate connection recommendation levels based on the acquired types of the service.

Further, the controller 190 may calculate the connection recommendation level in view of received power for the detected cellular communication network. For example, the controller 190 adjusts the connection recommendation level to be higher as the received power is higher.

(e) Unprovided Service Type:

The controller 190 specifies an unprovided service type which is a type of service not provided to the own equipment by the detected cellular communication network based on the provided service type specified as described above.

Returning to FIG. 3, the controller 190 causes the information (a) to (e) specified and calculated in step S3 to be displayed on the display 112 in step S4. In a case where there are two or more detected cellular communication networks, the controller 190 causes the information (a) to (e) for each of the two or more detected cellular communication networks to be displayed on the display 112.

FIG. 6 is a diagram illustrating a screen display example according to an embodiment. The controller 190 causes the display screen illustrated in FIG. 6 to be displayed on the display 112.

The display screen illustrated in FIG. 6 includes a display region R1 corresponding to the local cellular communication network 220 and a display region R2 corresponding to the public cellular communication network 210 in addition to a character string "Search Result" indicating that a result of network search is displayed.

The display region R1 includes a network identifier "AAA-5G" of the local cellular communication network 220, a network type "Local 5G" of the local cellular communication network 220, buttons B11 to B16 respectively provided for the service types, and a connection recommendation level "Recommended" of the local cellular communication network 220. The controller 190 may cause the calculated score to be displayed along with such display of the connection recommendation level. The buttons B11 to B16 respectively provided for the service types are displayed in a distinguishable manner between the provided service type and the unprovided service type. For example, the buttons B11, B12 and B14 corresponding to the unprovided service types are grayed out, and the buttons B13, B15 and B16 corresponding to the provided service types are highlighted.

The display region R2 includes a network identifier "BBB-5G" of the public cellular communication network 210, buttons B21 to B26 respectively provided for the service types, and a connection recommendation level "Not recommended" of the public cellular communication network 210. The controller 190 may cause the calculated score to be displayed along with such display of the connection recommendation level. The buttons B21 to B26 respectively provided for the service types are displayed in a distinguishable manner between the provided service type and the unprovided service type. For example, the buttons B23, B25 and B26 corresponding to the unprovided service types are grayed out, and the buttons B21, B22 and B24 corresponding to the provided service types are highlighted.

As a result of the information as illustrated in FIG. 6 being displayed, the user of the communication equipment 100 can grasp details of each detected cellular communication network, particularly, the provided service types, so that the user can easily appropriately select a cellular communication network which is a connection destination.

Figure 7:
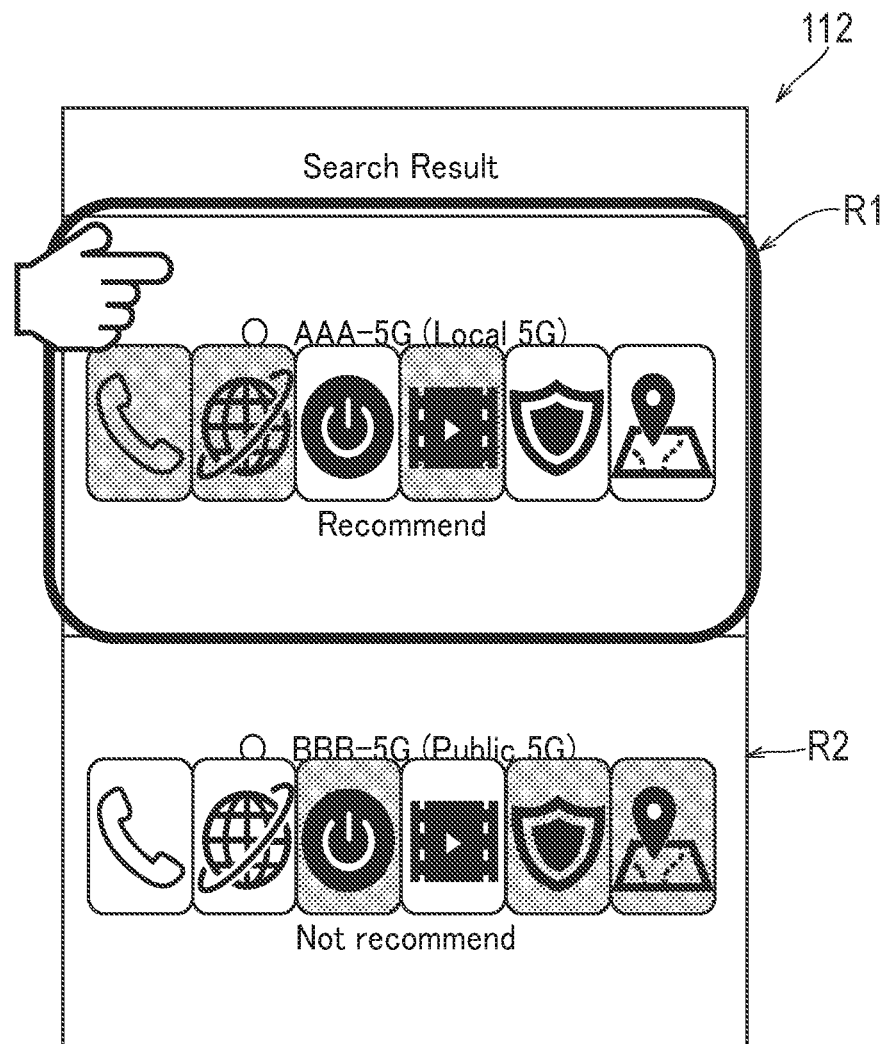
FIG. 7 is a diagram illustrating a screen display example according to an embodiment.

Returning to FIG. 3, in a case where the touch panel 111 accepts user operation of selecting the detected cellular communication network displayed on the display 112, the controller 190 selects the detected cellular communication network selected through the user operation as a connection destination of the own equipment in step S5. For example, as illustrated in FIG. 7, in a case where the user manipulates the display region R1, the controller 190 selects the local cellular communication network 220 as the connection destination of the own equipment.

Alternatively, the controller 190 may automatically select the cellular communication network which is a connection destination of the own equipment. For example, the controller 190 selects the detected cellular communication network which is the most recommended network to be connected as the connection destination of the own equipment based on the connection recommendation level.

The controller 190 may make a provision request of requesting provision of service of the unprovided service type to the connected cellular communication network in step S6. Specifically, in a case where the unprovided service type displayed on the display 112 is selected through user operation, the controller 190 transmits a provision request of requesting provision of service of the selected unprovided service type to the detected cellular communication network (cellular communication network which is the connection destination) via the cellular interface 151.

Here, as illustrated in FIG. 8A, a case will be assumed where the touch panel 111 accepts user operation of selecting a button of the unprovided service type grayed out in the display. In this case, the controller 190 requests provision of service corresponding to this button to the detected cellular communication network (cellular communication network which is the connection destination). In a case where this provision request is approved by the detected cellular communication network, as illustrated in FIG. 8B, the controller 190 switches display of the selected button from display of the unprovided service type to display of the provided service type (highlighted display).

For example, the controller 190 makes a service provision request with Requested NSSAI indicating a type of service for which a request for provision is to be made, included in a Registration Request message which is one type of a NAS message to be transmitted to the detected cellular communication network. The controller 190 may transmit a UEAssistanceInformation message which is one type of an RRC message to the detected cellular communication network as provision of service of the low power consumption function or the temperature abnormality prevention function.

Figure 9:
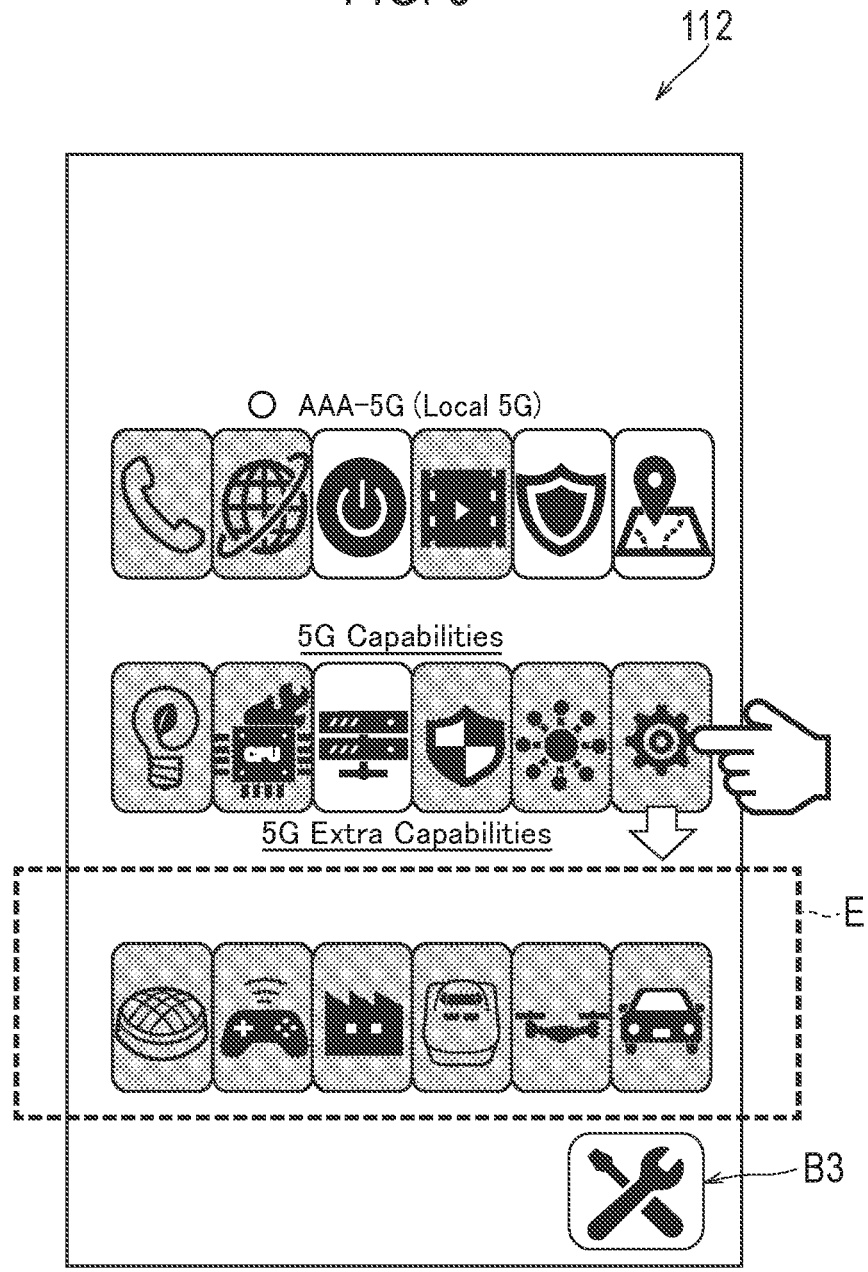
FIG. 9 is a diagram illustrating a screen display example according to an embodiment.

Note that as illustrated in FIG. 9, the controller 190 may display various kinds of buttons E for requesting provision of service of particular types of service (5G Extra Capabilities) among the types of service of 5G (5G Capabilities).

Further, in FIG. 9, the button B3 is a button for executing a maintenance mode. The maintenance mode is a mode for reporting a service provision status of the cellular communication network (particularly, the local cellular communication network 220) to the server 300.

During the maintenance mode, the controller 190 transmits a report message including the network identifier indicating the detected cellular communication network and the provided service types of this detected cellular communication network to the server 300 via the cellular interface 151. The controller 190 may transmit the report message further including information of received power corresponding to this detected cellular communication network. The controller 190 may transmit the report message further including position information indicating a position of the own equipment (that is, position information detected by the position sensor). Execution of such a maintenance mode allows an administrator side to grasp a communication status (position information, a reception status) and the provided service types of the cellular communication network.

The controller 190 may automatically transmit the report message to the server 300 without user operation of executing the maintenance mode. For example, in a case where the connection recommendation level satisfies a predetermined condition, the controller 190 transmits the report message to the server 300. Here, the predetermined condition may be a condition that the connection recommendation level is lower than a threshold. This allows the administrator side to grasp a cellular communication network which contributes less to service. Alternatively, the predetermined condition may be a condition that the connection recommendation level is higher than a threshold. This allows the administrator side to grasp a cellular communication network which contributes more to service.

Other Embodiments

Other embodiments will be described next. At least part of the embodiments which will be described below may be implemented by being combined with at least part of the above-described embodiment.

Figure 10A:
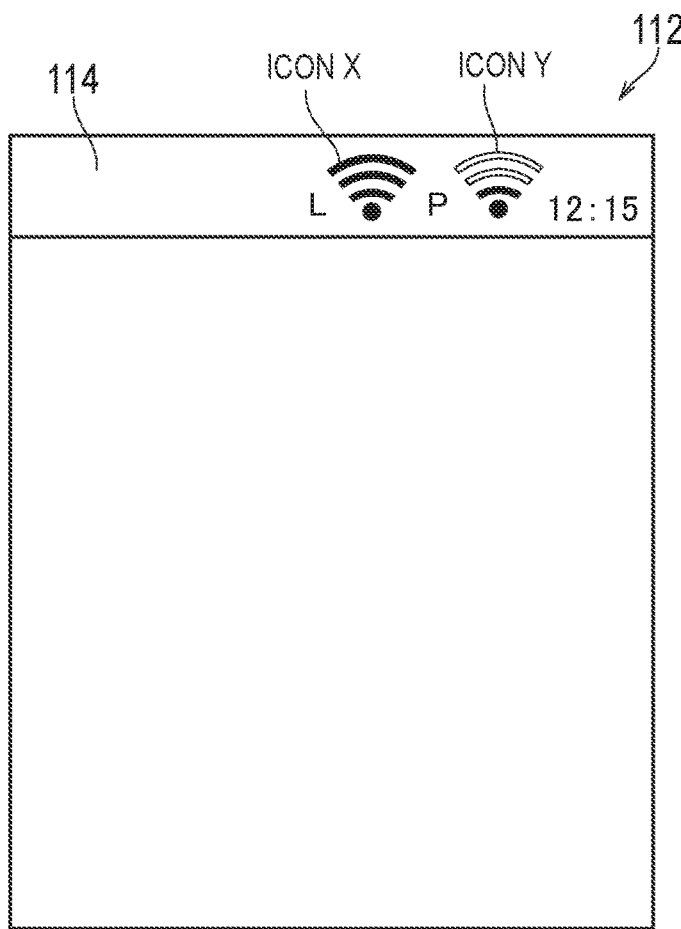
FIGS. 10A to 10C are diagrams illustrating a screen display example according to an embodiment.
Figure 10B:
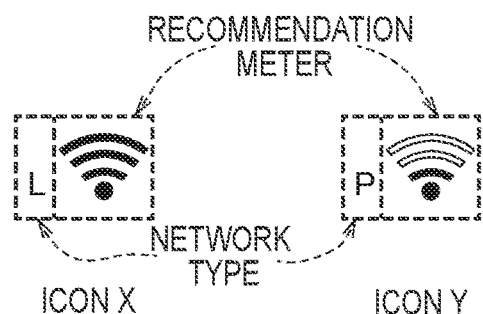
Figure 10C:
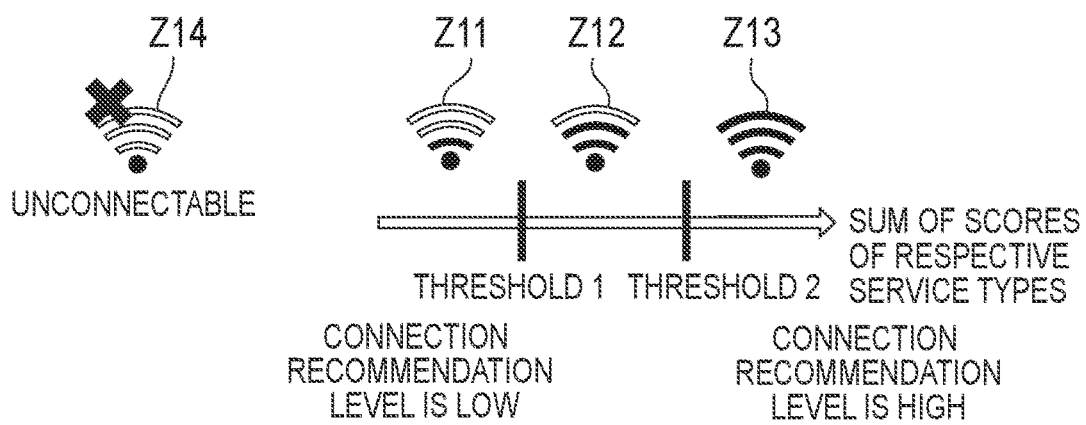

FIGS. 10A to 10C are diagrams illustrating an example of a screen displayed on the display 112 of the communication equipment 100 according to an embodiment.

The communication equipment 100 according to an embodiment may display at least one of a first image (first object) corresponding to a connection recommendation level of a first network type and a second image (second object) corresponding to a connection recommendation level of a second network type on at least part of the display 112 based on the detected cellular communication network. While FIGS. 10A to 10C illustrate an example where each of the first object and the second object is an icon, the objects only require to be displayed in a distinguishable manner between the objects, and each object may be, for example, one of characters, a number, a graphic and a symbol or combination thereof.

For example, as illustrated in FIG. 10A, the controller 190 may display an icon X as the first image and an icon Y as the second image at an upper portion 114 (so-called pictographic region) of the display 112. The icon X includes a symbol "L" indicating a network type of the local cellular communication network 220, and a recommendation meter indicating a degree of the connection recommendation level of the local cellular communication network 220. The icon Y includes a symbol "P" indicating a network type of the public cellular communication network 210, and a recommendation meter indicating a degree of the connection recommendation level of the public cellular communication network 210.

The controller 190 may change a display style of the recommendation meter in accordance with the connection recommendation level corresponding to the network type of the detected cellular communication network at the icons X and Y. The controller 190 may configure one of a style Z11, a style Z12 and a style Z13 illustrated in FIG. 10C as the display style of the recommendation meter in accordance with the connection recommendation level corresponding to the network type of the detected cellular communication network. A condition for changing the display style of the recommendation meter may be configured in advance at the communication equipment 100. The condition is, for example, a threshold corresponding to a sum of respective service types (for example, the service types illustrated in FIG. 4 and FIG. 5). As illustrated in FIG. 10C, the controller 190 changes the display style of the recommendation meter to the display style Z11 in a case where the connection recommendation level corresponding to the network type of the detected cellular communication network (in this description, a sum of the scores of the respective service types) is equal to or less than a threshold 1, changes the display style to the display style Z12 in a case where the connection recommendation level exceeds the threshold 1 and is equal to or less than a threshold 2, and changes the display style to the display style Z13 in a case where the connection recommendation level exceeds the threshold 2. In other words, the icon X and the icon Y in FIG. 10A indicate that the connection recommendation level of the first network type is higher than the connection recommendation level of the second network type.

However, instead of expressing the connection recommendation level with the meter as illustrated in FIG. 10C or in addition to expressing the connection recommendation level with the meter, it is also possible to express the connection recommendation level by changing at least one of color, a size and a blinking rate of the object (image).

Further, in a case where the detected cellular communication network becomes unconnectable (for example, in a case where received power of a radio signal transmitted by a base station corresponding to the detected cellular communication network becomes equal to or less than a predetermined threshold), the controller 190 may change the display style of the recommendation meter to a style Z14 as illustrated in FIG. 10C.

With such communication equipment 100, for example, a state of the detected cellular communication network can be easily confirmed even in a case where an application screen (for example, an Internet browser screen) is displayed using a portion other than the upper portion 114 of the display 112.

In the following example, description will be provided assuming that the connection recommendation level of the first network type is higher than the connection recommendation level of the second network type.

Figure 11:
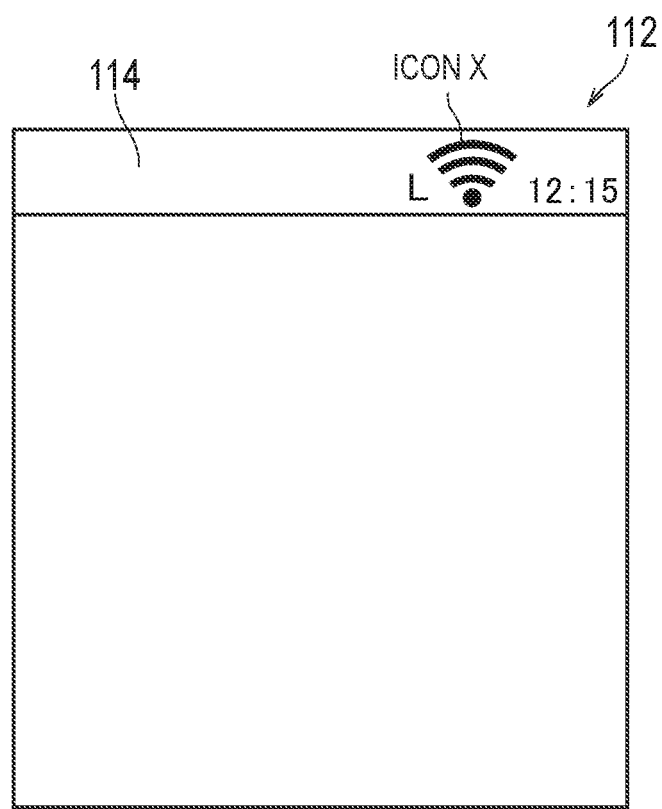
FIG. 11 is a diagram illustrating a screen display example according to an embodiment.

The communication equipment 100 according to an embodiment may highlight and display an image corresponding to the network type with a higher connection recommendation level on at least part of the display 112 based on the connection recommendation level of the detected cellular communication network. For example, the controller 190 may display only one of the icon X and the icon Y which corresponds to a network type with a higher connection recommendation level at the upper portion 114 of the display 112 based on the connection recommendation level of the detected cellular communication network. Specifically, as illustrated in FIG. 11, the controller 190 may display the icon X corresponding to the connection recommendation level of the first network type at the upper portion 114 of the display 112. Note that the controller 190 may display the icon Y corresponding to the connection recommendation level of the second network type at the upper portion 114 of the display 112 in place of the icon X in a case where the connection recommendation level of the second network type becomes higher than the connection recommendation level of the first network type.

Further, in a case where only one of the icon X and the icon Y which corresponds to a network type with a higher connection recommendation level is displayed at the upper portion 114 of the display 112, the controller 190 may change the display style of the one icon to indicate that the other icon is not displayed. For example, the controller 190 may change the display style so that the one icon is blinked or color of the one icon is changed.

The communication equipment 100 according to an embodiment may display details of each detected cellular communication network corresponding to at least one of the first image (first object) and the second image (second object) in accordance with first operation.

Figure 12A:
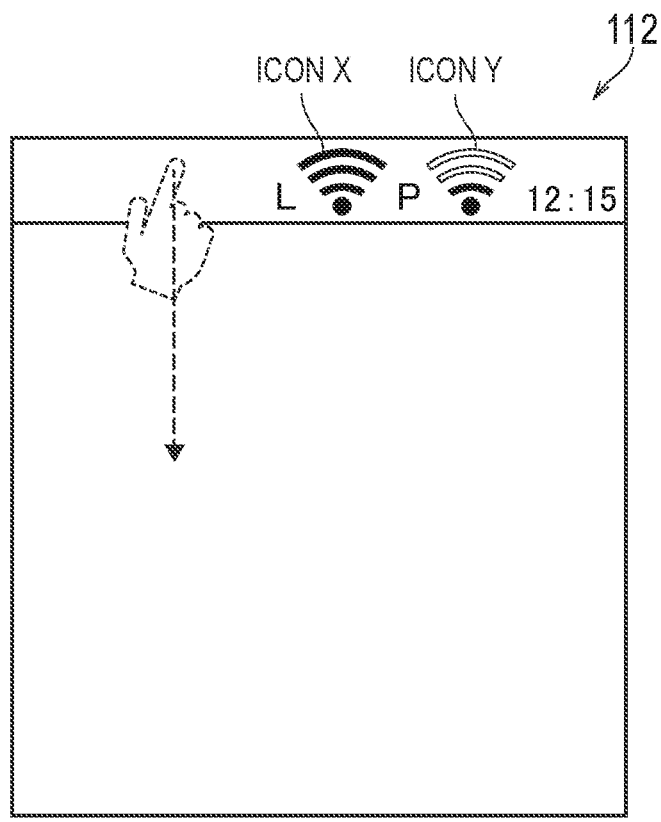
FIGS. 12A and 12B are diagrams illustrating a screen display example according to an embodiment.
Figure 12B:
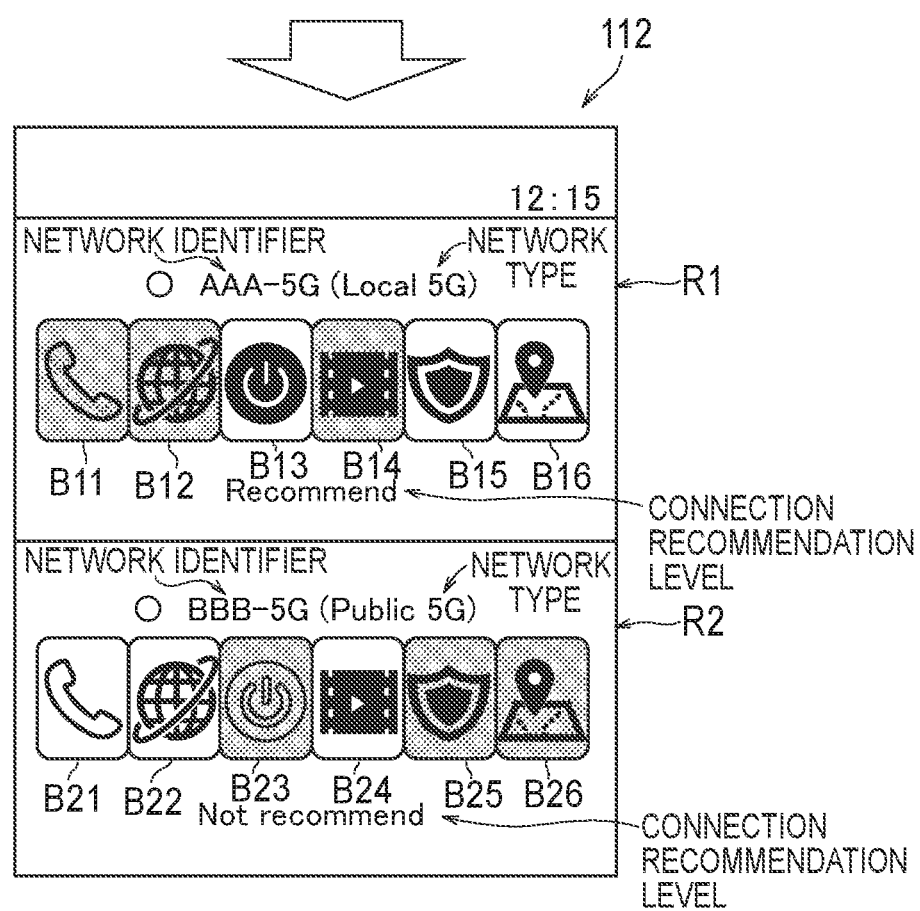

For example, as illustrated in FIG. 12A, in a case where the first image (the first object) corresponding to the connection recommendation level of the first network type and the second image (second object) corresponding to the connection recommendation level of the second network type are displayed on at least part of the display 112 based on the detected cellular communication networks (for example, in a case where the icon X and the icon Y are displayed in accordance with the connection recommendation levels of the detected cellular communication networks), the controller 190 displays details of respective detected cellular communication networks corresponding to the icon X and the icon Y on the display 112 (here, display which is the same as the region R1 and the region R2 in FIG. 6 will be described as an example of the details) as illustrated in FIG. 12B in a case where the controller 190 accepts the first operation (for example, operation of touching a region of the upper portion 114 with the finger and flicking the region downward, so-called flick operation) with respect to the upper portion 114 of the display 112.

Figure 13A:
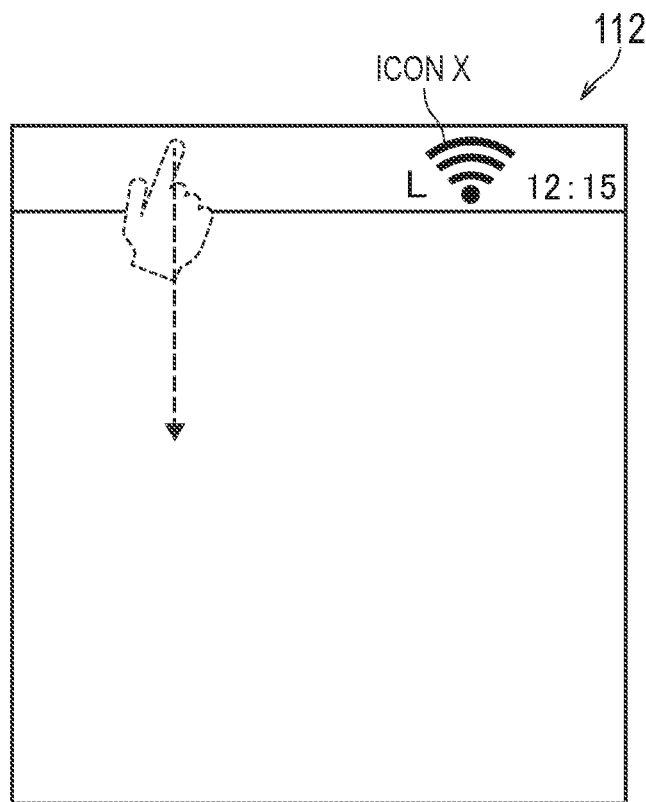
FIGS. 13A and 13B are diagrams illustrating a screen display example according to an embodiment.
Figure 13B:
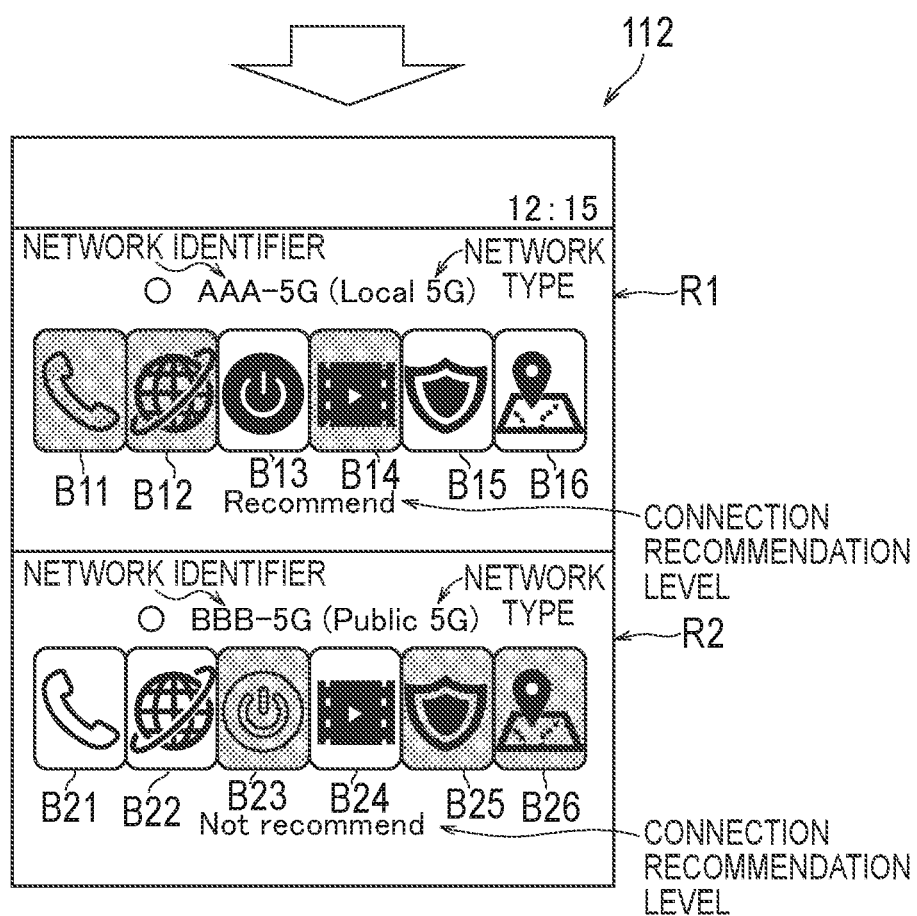

For example, as illustrated in FIG. 13A, in a case where an image corresponding to a network type with a higher connection recommendation level is highlighted and displayed on at least part of the display 112 based on the connection recommendation levels of the detected cellular communication networks (for example, in a case where only the icon X between the icon X and the icon Y is displayed in accordance with the connection recommendation levels of the detected cellular communication networks), the controller 190 displays details of the respective detected cellular communication networks corresponding to the icon X and the icon Y on the display 112 as illustrated in FIG. 13B (here, display which is the same as the region R1 and the region R2 in FIG. 6 will be described as an example of the details) in a case where the controller 190 accepts the first operation (for example, operation of touching the region of the upper portion 114 with the finger and flicking the region downward, so-called flick operation) with respect to the upper portion 114 of the display 112. In other words, the controller 190 displays the details of the icon Y which is hidden on the display 112 along with the details of the icon X in a case where the controller 190 accepts the first operation.

The communication equipment 100 according to an embodiment may display details of the detected cellular communication network corresponding to one of the first image (first object) and the second image (second object) in accordance with second operation.

Figure 14A:
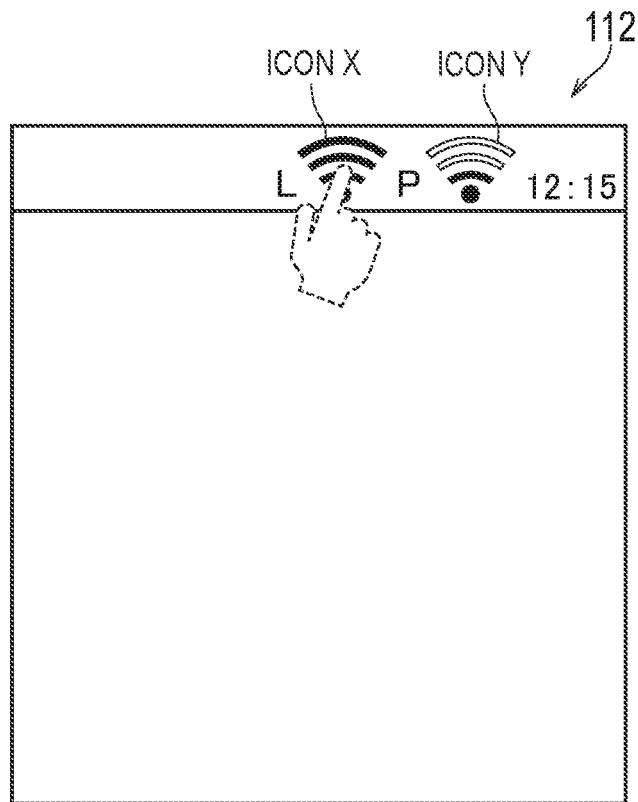
FIGS. 14A and 14B are diagrams illustrating a screen display example according to an embodiment.
Figure 14B:
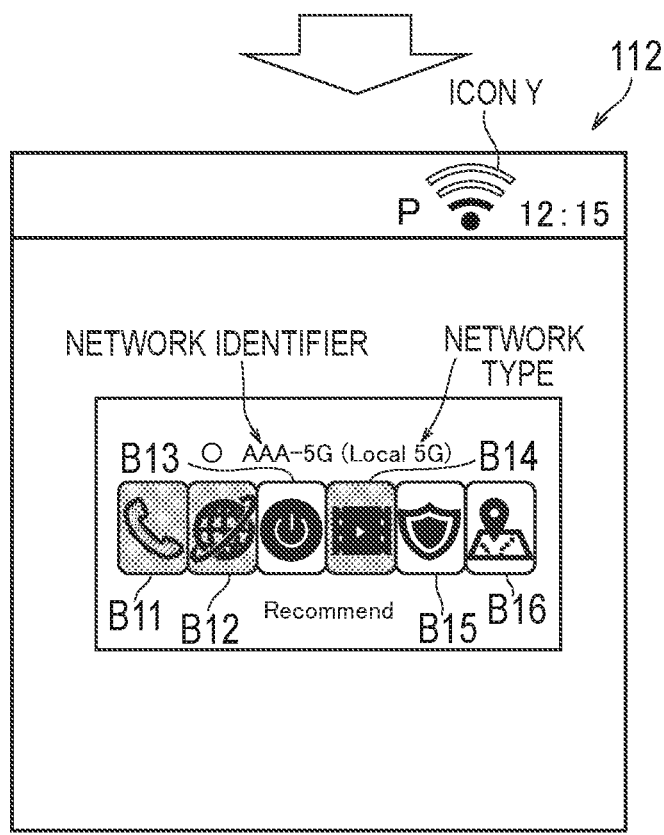

For example, as illustrated in FIG. 14A, in a case where the first image corresponding to the connection recommendation level of the first network type and the second image corresponding to the connection recommendation level of the second network type are displayed on at least part of the display 112 based on the detected cellular communication networks (for example, in a case where the icon X and the icon Y are displayed in accordance with the connection recommendation levels of the detected cellular communication networks), the controller 190 displays details of the detected cellular communication network corresponding to the icon X on the display 112 as illustrated in FIG. 14B (here, display which is the same as the region R1 in FIG. 6 will be described as an example of the details), in a case where the controller 190 accepts the second operation (for example, operation of touching the icon X with the finger and releasing the finger from the display 112 after a predetermined period, so-called tap operation) with respect to the icon X. Further, as illustrated in FIG. 14B, in a case where the details of the detected cellular communication network corresponding to the icon X are displayed on the display 112, the controller 190 may hide the icon X at the upper portion 114.

Figure 15A:
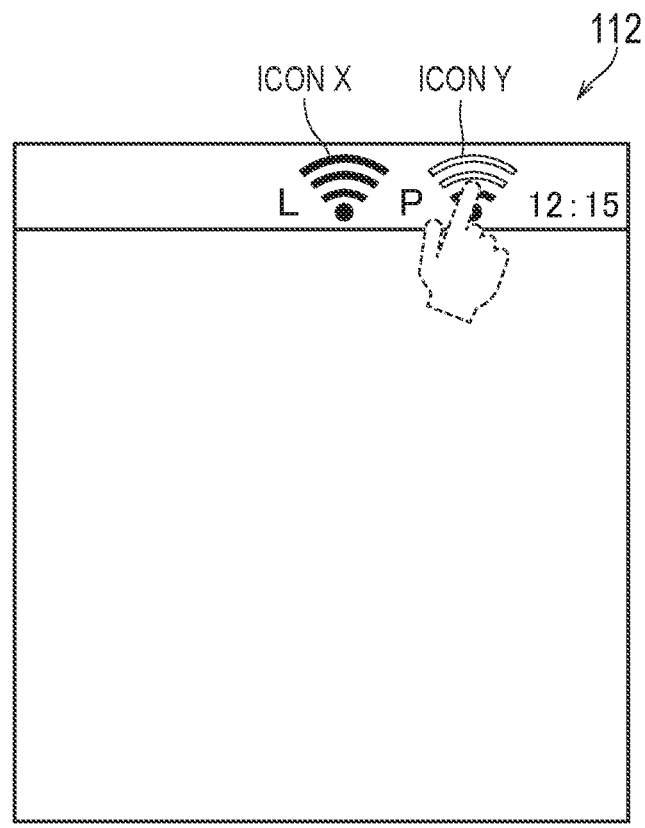
FIGS. 15A and 15B are diagrams illustrating a screen display example according to an embodiment.
Figure 15B:
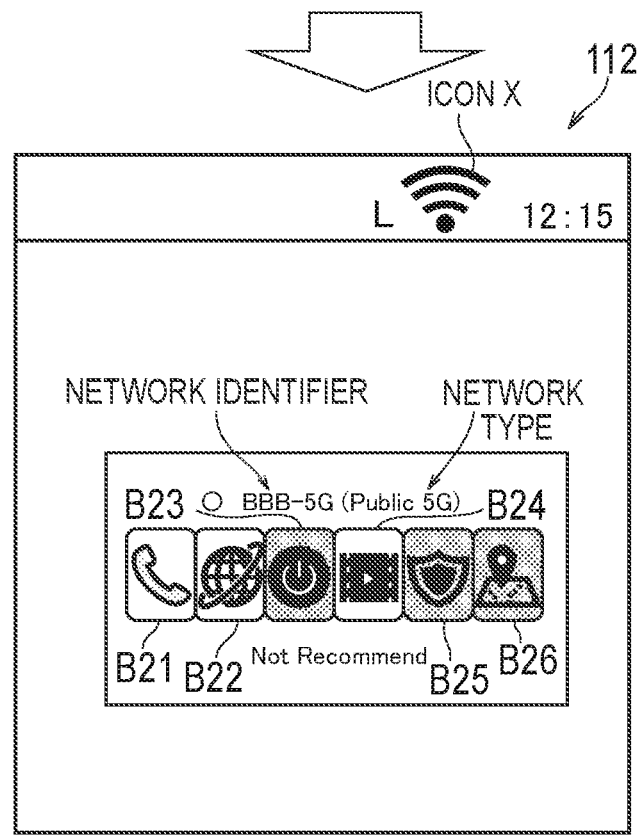

For example, as illustrated in FIG. 15A, in a case where the first image corresponding to the connection recommendation level of the first network type and the second image corresponding to the connection recommendation level of the second network type are displayed on at least part of the display 112 based on the detected cellular communication networks (for example, in a case where the icon X and the icon Y are displayed in accordance with the connection recommendation levels of the detected cellular communication networks), the controller 190 displays details of the detected cellular communication network corresponding to the icon Y on the display 112 as illustrated in FIG. 15B (here, display which is the same as the region R2 in FIG. 6 will be described as an example of the details) in a case where the controller 190 accepts the second operation (for example, operation of touching the icon Y with the finger and releasing the finger from the display 112 after a predetermined period, so-called tap operation) with respect to the icon Y. Further, as illustrated in FIG. 15B, in a case where the details of the detected cellular communication network corresponding to the icon Y are displayed on the display 112, the controller 190 may hide the icon Y at the upper portion 114.

In a case where details of the detected cellular communication network corresponding to one of the first image (first object) and the second image (second object) are displayed, the communication equipment 100 according to an embodiment may display details of the detected cellular communication network corresponding to the other in accordance with third operation.

For example, as illustrated in FIG. 16A, in a case where details of the detected cellular communication network corresponding to one of the first image and the second image are displayed (for example, in a case where details of the detected cellular communication network corresponding to the icon X are displayed on the display 112), the controller 190 displays details of the detected cellular communication network corresponding to the icon Y on the display 112 as illustrated in FIG. 16B in a case where the controller 190 accepts the third operation (for example, flick operation of touching a predetermined region with the finger and flicking the region leftward). Further, as illustrated in FIG. 16A, in a case where the details of the detected cellular communication network corresponding to the icon X are displayed on the display 112, the controller 190 may hide the icon X at the upper portion 114. Further, as illustrated in FIG. 16B, in a case where the details of the detected cellular communication network corresponding to the icon Y are displayed on the display 112, the controller 190 may hide the icon Y at the upper portion 114.

A program that causes a computer to execute each process executed by the communication device 100 may also be provided. Furthermore, the program may also be recorded on a computer-readable medium. If a computer-readable medium is employed, the program can be installed on a computer. Here, the computer-readable medium whereon the program is recorded may also be a non-transitory recording medium. A non-transitory recording medium is not particularly limited and may be a recording medium such as a CD-ROM or DVD-ROM, for example.

Although one embodiment has been described in detail with reference to the drawings, the specific configuration is not limited to the above, and various design changes and the like can be made without departing from the gist.

The invention claimed is:

1. A communication equipment comprising:
a communication interface configured to detect a cellular communication network from among a public cellular communication network and a non-public cellular communication network; and
a circuitry configured to acquire network related information via the communication interface from the detected cellular communication network, wherein
the circuitry is configured to:
specify, based on the network related information, a provided service type which is a type of service provided by the detected cellular communication network to the communication equipment;
cause the specified provided service type to be displayed on a display;
calculate, based on the specified provided service type, a first connection recommendation level indicating a level of recommendation of connection to the detected public cellular communication network, and a second connection recommendation level indicating a level of recommendation of connection to the detected non-public cellular communication network;
cause both the first connection recommendation level and the second connection recommendation level to be further displayed on the display; and
in a case where a displayed unprovided service type is selected through user operation, the circuitry is configured to transmit, to the detected cellular communication network via the communication interface, a provision request of requesting provision of service of the selected unprovided service type.

2. The communication equipment according to claim 1, wherein
each of the public cellular communication network and the non-public cellular communication network is theoretically divided into a plurality of slices in accordance with different service types, and
the network related information includes identifiers respectively allocated to the plurality of slices.

3. The communication equipment according to claim 1, wherein
the circuitry is further configured to cause a network type to be displayed on the display, the network type indicating whether the detected cellular communication network is the public cellular communication network or the non-public cellular communication network.

4. The communication equipment according to claim 1, wherein
the circuitry is further configured to cause an unprovided service type to be displayed on the display, the unprovided service type being a type of service not provided by the detected cellular communication network to the communication equipment.

5. The communication equipment according to claim 1, wherein
the circuitry is configured to control the display so as to switch display of the selected unprovided service type to display of the provided service type in a case where the provision request is approved by the detected cellular communication network.

6. The communication equipment according to claim 1, wherein
in a case where two or more detected cellular communication networks are detected by the communication interface, the circuitry is configured to cause a network identifier indicating the detected cellular communication network and the provided service type to be displayed on the display for each of the two or more detected cellular communication networks.

7. The communication equipment according to claim 1, wherein
when accepting user operation of selecting the detected cellular communication network for which the provided service type is displayed, the circuitry is configured to select the selected detected cellular communication network as a connection destination of the communication equipment.

8. The communication equipment according to claim 1, wherein
the circuitry is configured to calculate the connection recommendation level based on past results of use of service of the communication equipment and the specified provided service type.

9. The communication equipment according to claim 1, wherein
the circuitry is configured to calculate the connection recommendation level based on information regarding other communication equipment connected to the communication equipment and the specified provided service type.

10. The communication equipment according to claim 1, wherein
the circuitry is configured to determine whether or not to select, based on the calculated connection recommendation level, the detected cellular communication network as a connection destination of the communication equipment.

11. The communication equipment according to claim 1, wherein
the circuitry is configured to transmit, to a server via the communication interface, a report message including a network identifier indicating the detected cellular communication network and the provided service type.

12. The communication equipment according to claim 11, wherein the circuitry is configured to transmit the report message further including position information indicating a position of the communication equipment.

13. The communication equipment according to claim 1, wherein the circuitry is configured to transmit, to a server via the communication interface, a report message including a network identifier indicating the detected cellular communication network and the provided service type, and the circuitry is configured to transmit the report message to the server in a case where the connection recommendation level satisfies a predetermined condition.

14. A control method for controlling communication equipment comprising a display and a communication interface which corresponds cellular communication, the control method comprising:

detecting a cellular communication network from among a public cellular communication network and a non-public cellular communication network;

acquiring network related information via the communication interface from the detected cellular communication network;

specifying, based on the network related information, a provided service type which is a type of service provided by the detected cellular communication network to the communication equipment;

causing the specified provided service type to be displayed on the display;

calculating, based on the specified provided service type, a first connection recommendation level indicating a level of recommendation of connection to the detected public cellular communication network, and a second connection recommendation level indicating a level of recommendation of connection to the detected non-public cellular communication network; and causing both the first connection recommendation level and the second connection recommendation level to be further displayed on the display; and in a case where a displayed unprovided service type is selected through user operation, transmitting, to the detected cellular communication network via the communication interface, a provision request of requesting provision of service of the selected unprovided service type.

* * * * *